United States Patent Office 3,161,648
Patented Dec. 15, 1964

3,161,648
PROCESS FOR PREPARING N,N-DIISOPROPYL-BENZOTHIAZOLE-2-SULFENAMIDE
James Michael Rodgers, Hillsborough Township, Somerset County, and Robert Chalk Kinstler, Bridgewater Township, Somerset County, N.J., assignors to American Cyanamid Company, Stamford, Conn., a corporation of Maine
No Drawing. Filed Apr. 11, 1963, Ser. No. 272,239
4 Claims. (Cl. 260—306.6)

This invention relates to, and has for its object, an improved process for the manufacture of the compound, N,N-diisopropylbenzothiazole-2-sulfenamide.

N,N-diisopropylbenzothiazole-2-sulfenamide is a commercially important, delayed-action vulcanization accelerator for both natural and synthetic rubber. Various procedures have been proposed for its manufacture. One such procedure involved the reaction of an alkali metal salt of 2-mercaptobenzothiazole with an N-halogenated diisopropylamine in aqueous or alcoholic solution.

This early attempt was discarded for commercial use because of low yields and poor quality of products. A modification of this process resulted in a satisfactory improvement in both yields and quality. By this modification, an aqueous solution of an alkali metal salt of 2-mercaptobenzothiazole was reacted with N-halogenated diisopropylamine, the reaction being conducted in the presence of diisopropylamine and at carefully controlled hydrogen ion concentration. Yields from this method approximated 85-95%, and, moreover, the product was of improved quality.

The most serious drawback to this improved method was the requirement that the mercaptobenzothiazole salt had to be specially purified by first a pre-oxidation treatment and then charcoal filtration, before reaction with the halogenated diisopropylamine. See U.S. Patent No. 2,776,297. Use of mercaptobenzothiazole salt that was not carefully purified resulted in a product with unsatisfactory purity and which was unstable in ordinary storage.

An alternate route to N,N-diisopropylbenzothiazole-2-sulfenamide, wherein an alkali metal salt of 2-mercaptobenzothiazole was reacted with diisopropylamine and oxidized in either an aqueous or an alcoholic solution, was found commercially unsatisfactory primarily because of the poor quality of product.

In view of the shortcomings of the various known processes, it is an object of this invention to provide a commercially useful method by which N,N-diisopropylbenzothiazole-2-sulfenamide of superior quality can be obtained in high yields from commercially available 2-mercaptobenzothiazole.

This and other objects are accomplished in accordance with the present invention in a simple and efficient manner. Yields of 95%, and commonly 98-99%, of high quality product suitable for use without purification, are easily obtainable. Moreover, 2-mercaptobenzothiazole per se can be employed, thus avoiding the previous requirement for a specially purified alkali metal salt thereof. These advantages are made possible by the surprising discovery that the reaction of 2-mercaptobenzothiazole with N-chlorodiisopropylamine should be conducted in a special two component non-aqueous, organic reaction medium in the presence of diisopropylamine.

Moreover, it is a further advantage of the present process that part of the diisopropylamine formerly used as solvent, is replaced by more effective, although less expensive, solvents.

The process of this invention generally involves adding 2-mercaptobenzothiazole to a cooled mixture of N-chlorodiisopropylamine, methanol, an aromatic non-polar solvent and diisopropylamine and allowing the exothermic reaction to proceed at a temperature of about 40-60° C., preferably about 50° C., to completion. The reaction product, containing the desired N,N'-diisopropylbenzothiazone-2-sulfenamide, can be treated by conventional methods for recovery of the desired product.

While it is not absolutely critical that the above-outlined order of addition be followed, it is found extremely desirable to do so, for if the two primary reactants are placed in direct contact with each other, the resulting reaction mixture is rendered extremely difficult to stir during the reaction period.

As can be noted, 2-mercaptobenzothiazole reacts mole for mole with N-chlorodiisopropylamine. It is most desirable, for purposes of efficiency, that the reaction mixture contain the reactants in approximately equimolar proportion. Likewise, since one mole of diisopropylamine is required for each mole of product formed, it is desirable that it be present in approximately a molar amount, based on the quantity of starting materials. However, a slight excess over the molar amount (preferably between 1.1 and 1.2 moles, or even up to 2.0 moles) of diisopropylamine may be employed.

It is extremely critical for purposes of this invention that the reaction solvent be a combination of methanol and an aromatic non-polar solvent such as benzene, toluene, xylene or, preferably, chlorobenzene. At least 0.2 parts of methanol per part of N-chlorodiisopropylamine should be employed. Preferably, between 0.5 and 0.7 parts may be used. The only real upper limit to the amount of methanol employed is the size of the reaction vessel.

For each part by weight of methanol, at least about one part of aromatic non-polar solvent should be employed. About two to four weight parts of the latter for each part of methanol should preferably be employed, although more may be used without adverse effect.

It is a surprising fact to consider, that only methanol from among alkanols as a class, leads to a virtually quantitative yield of high quality final product. When use of other alcohols is attempted, the reaction is completed only very slowly and the resulting product is inferior as to purity.

After recation has been completed, as can be determined by a starch-iodide paper spot test (a negative reading indicating the complete consumption of N-chlorodiisopropylamine), the reaction product can be treated with a weak aqueous solution of an inorganic base (e.g., sodium hydroxide, sodium carbonate or potassium hydroxide) to give a 2-phase mixture. The aqueous layer, after a period is allowed for the settling of the organic layer, can be separated off. The organic layer can then be subjected to evaporation under vacuum to recover the solvents and leave the desired N,N-diisopropylbenzothiazole-2-sulfenamide as the residue. The product in this form has a purity in the rage of 97-98% and is present in the yield of about 98% or more, based on the weight of the starting materials.

The following examples, in which parts are by weight, illustrate the practice of the present invention.

*Example 1*

A mixture of 271 parts (2.0 moles) of N-chlorodiisopropylamine, 160 parts of methanol, 450 parts of chlorobenzene and 241 parts (2.38 moles) of 100% diisopropylamine is cooled to about 0° C. and 334 parts (2.0 moles) of 2-mercaptobenzothiazole is added slowly over about 2 to 3 hours, while allowing the temperature to rise to about 50° C. When the reaction is essentially complete after 50 minutes to one hour, as indicated by the absence of a blue color when a drop of the reaction mixture is placed on starch-iodide paper, 667 parts of 15% aqueous sodium hydroxide solution is added and the reaction mixture is stirred. The aqueous layer is then separated, and the solvents are recovered from the organic layer by a vacuum evaporation. The residue from the evaporation, when cooled and flaked, gives about 525–530 parts (98–99% of theory) of N,N-diisopropylbenzothiazole-2-sulfenamide of 97–99% purity. The product contains about 0.01% of material which is insoluble in methanol, and the product has excellent storage stability at 100° F.

*Example 2*

When isopropyl alcohol is used in place of methanol in the method of Example 1, the reaction consuming N-chlorodiisopropylamine, as the 2-mercaptobenzothiazole is added, proceeds very slowly. After 2.0 moles of 2-mercaptobenzothiazole has been added to the reaction mixture containing 2.0 moles of the N-chloroamine, the test on starch-iodide paper shows unreacted N-chloroamine present for 3½–4 hours. When the product is isolated as in Example 1, its purity is only 82.6%.

*Example 3*

When the process of Example 1 is followed using as reaction medium monochlorobenzene without the use of methanol, the reaction proceeds so slowly that eight hours after the addition of 2-mercaptobenzothiazole to the mixture of N-chlorodiisopropylamine and diisopropylamine, there is still a residual amount of unreacted materials. Only after heating to 70° C. for 20 hours does the N-chloro compound disappear, as evidenced by no more blue spot developing on moist starch-iodide.

We claim:

1. The process of preparing N,N-diisopropylbenzothiazole-2-sulfenamide which comprises:
    (a) bringing into reactive contact, in an inert, non-aqueous, organic medium, approximately equimolar amounts of 2-mercaptobenzothiazole, N-chlorodiisopropylamine and diisopropylamine,
    (b) said inert medium being a mixture of an aromatic non-polar solvent selected from the group consisting of benzene, toluene, xylene and chlorobenzene and methanol in a weight proportion between about 1:1 and 4:1,
    (c) maintaining the reaction temperature in the range of about 40–60° C. until the reaction is completed, and
    (d) recovering the product thus formed.
2. The process of claim 1 wherein the reaction temperature is maintained at about 50° C.
3. The process of claim 1 wherein the aromatic non-polar solvent is monochlorobenzene and about two parts are present for each part by weight of methanol.
4. The process for the preparation of N,N-diisopropylbenzothiazole-2-sulfenamide which comprises:
    (a) pre-forming a mixture of N-chlorodiisopropylamine and at least an equimolar amount of diisopropylamine in a solvent medium comprising methanol and monochlorobenzene,
    (b) cooling said pre-formed mixture and gradually adding thereto a molar amount of 2-mercaptobenzothiazole, based on the N-chlorodiisopropylamine,
    (c) maintaining the temperature of the reaction mixture in the range of about 50° C. until reaction is completed, and
    (d) recovering the desired product.

References Cited in the file of this patent

UNITED STATES PATENTS

| | | |
|---|---|---|
| 2,776,297 | Cherlow et al. | Jan. 1, 1957 |
| 3,055,909 | Kinstler et al. | Sept. 25, 1962 |